United States Patent [19]

Sugino et al.

[11] Patent Number: 4,952,932

[45] Date of Patent: Aug. 28, 1990

[54] INFORMATION INPUT APPARATUS

[75] Inventors: Toshio Sugino, Tokyo; Yoji Furuya, Inagi, both of Japan

[73] Assignee: Canon Kabushiki Kaisha, Tokyo, Japan

[21] Appl. No.: 183,637

[22] Filed: Apr. 19, 1988

[30] Foreign Application Priority Data

Apr. 30, 1987 [JP] Japan ................................ 62-104790
Nov. 11, 1987 [JP] Japan ................................ 62-283173

[51] Int. Cl.$^5$ ................................................ G09G 1/00
[52] U.S. Cl. ........................................ 341/23; 341/22; 340/712
[58] Field of Search .................... 341/23, 31; 340/712; 178/18

[56] References Cited

U.S. PATENT DOCUMENTS

| 4,567,480 | 1/1986 | Blanchard | 340/712 |
| 4,568,072 | 2/1986 | Plotroski | 340/712 |
| 4,725,694 | 2/1988 | Aver et al. | 340/712 |
| 4,763,356 | 8/1988 | Day, Jr. et al. | 340/712 |

FOREIGN PATENT DOCUMENTS

0110676 6/1984 European Pat. Off. ............ 340/712
1582941 1/1981 United Kingdom ................ 340/712

Primary Examiner—Donald J. Yusko
Assistant Examiner—Yuk H. Lau
Attorney, Agent, or Firm—Fitzpatrick, Cella, Harper & Scinto

[57] ABSTRACT

An information processing system inputs information by touching the surface of a touch panel provided on the screen of a CRT display. This apparatus includes a mode setting device to set the cleaning mode of the touch panel on the screen of the CRT display, and an input controller to set an input inhibition area of information on the touch panel when the cleaning mode is set. An inhibition area display device displays on the screen of the CRT display that the information input inhibition area is set on the touch panel by the input controller, and an inhibition area changing device changes the input inhibition area set by the input controller on the touch panel. With this apparatus, the cleaning mode can be set or cancelled on the screen of the CRT display even in the cleaning mode. The touch panel can be cleaned without causing an erroneous input due to touching the touch panel during the cleaning.

6 Claims, 7 Drawing Sheets

FIG. 9

INFORMATION INPUT APPARATUS

BACKGROUND OF THE INVENTION

1. Field of the Invention

The present invention relates to an information input apparatus to input information to an information processing system and, more particularly, to an information input apparatus to input information to an information processing system by touching, e.g., a finger or the like, an input surface.

2. Related Background Art

What is called a touch panel apparatus is known as a kind of information input apparatus. This touch panel apparatus is assembled in a computer system or an information processing system using a computer and is used by overlaying a transparent input section onto a display surface of a display device in the information processing system. An operator can input information by touching indicating means, such as a pen, finger or the like, onto the input surface of the input section of the touch panel apparatus while looking at the content displayed on the screen of the display device or the like through the transparent input section of the touch panel apparatus. In general, a power source is supplied to the touch panel apparatus from, for instance, the main unit of the information processing system and the turn-on/off of the power source cannot be performed by the touch panel apparatus itself.

In the touch panel apparatus, since the information is input by touching a pen, finger or the like onto the input surface, dirt is deposited onto the input surface by the touch. When this dirt is cleaned, if the cleaning is performed after the turn-on of the power source of the information input apparatus, that is, in a state in which information can be input, the input surface is touched at random by the cleaning operation, so that the input is erroneously executed and a malfunction of the apparatus occurs. Therefore, when cleaning, it is necessary to turn off the power source of the touch panel apparatus by turning off the power source of the information processing system main unit.

However, since the information stored in a memory or the like is erased by the turn-off of the power source of the information processing system main unit, it is necessary to perform complicated operations such that the stored information is previously saved into a nonvolatile memory or the like. On the other hand, in the case where the power source of the apparatus cannot be turned off because the information processing system is operated for twenty-four hours in a day, there is a problem such that the input surface cannot be cleaned or the like.

SUMMARY OF THE INVENTION

The present invention is made in consideration of the foregoing conventional apparatuses and it is an object of the invention to provide an information input apparatus which can clean the input surface without the fear of the apparatus malfunctioning, even when the power source of the information processing system is turned on.

DETAILED DESCRIPTION OF THE EMBODIMENTS

A preferred embodiment of the present invention will be described in detail hereinbelow with reference to the drawings. An information input apparatus in the embodiment which will be explained hereinafter comprises a touch panel and detects the coordinates of the touched position and inputs the information thereof in a well-known method. The detailed description of the input method is omitted here.

(A) FIRST EMBODIMENT

Figure 1:
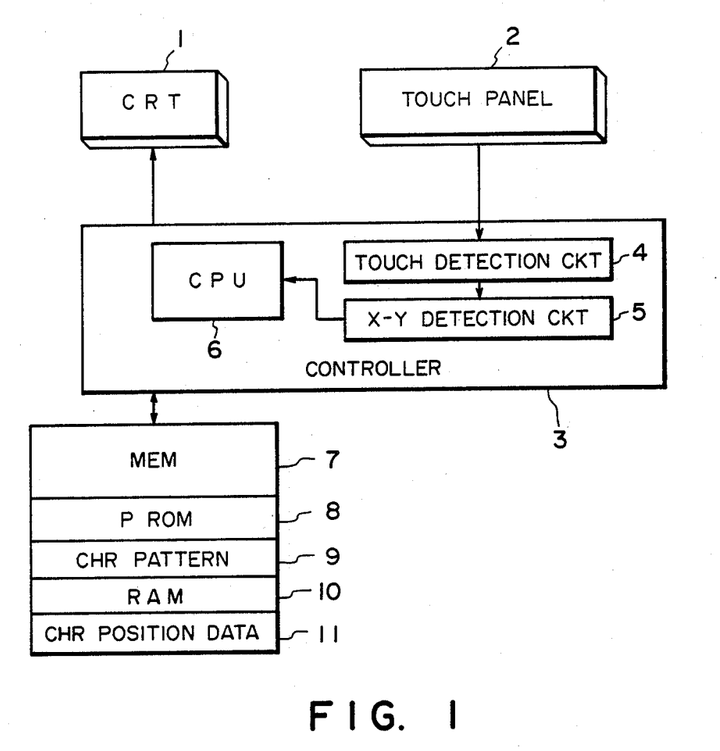
FIG. 1 is a block diagram showing a constitution of an information input apparatus according to an embodiment.

Description of a Constitution of the Information Input Apparatus (FIG. 1)

FIG. 1 is a block diagram showing a schematic constitution of an information input apparatus constituted as a touch panel apparatus in the first embodiment.

In the diagram, reference numeral 1 denotes a CRT display. A transparent pressure sensitive type touch panel 2 is attached onto the surface of the CRT display 1. An operator touches the touch panel 2 while looking at the content displayed on the CRT display 1. The touch is detected by a touch detection circuit 4 in a controller 3. A detection signal corresponding to the position of the touched input point is output from the touch detection circuit 4.

The detection signal from the touch detection circuit 4 is input to an X-Y detection circuit 5. The X-Y detection circuit 5 processes the input signal and performs an arithmetic operation or the like, thereby detecting the (x, y) coordinates of the input point touched on the touch panel 2 and outputting to a CPU 6.

The controller 3 has not only the foregoing touch panel detection circuit 4, X-Y detection circuit 5, and the like but also the CPU 6 such as a microprocessor or the like to control the whole apparatus. The controller 3 performs the control in accordance with a control program stored in a program ROM 8 in a memory 7. The ROM section in the memory 7 includes the program ROM 8 in which the control program of the CPU 6 is stored, a character pattern 9 in which image data for a cleaning mode, which will be explained later, is stored, a pattern data area to store various kinds of character patterns or the like, a dictionary, and the like. An RAM section 10 in the memory 7 includes an RAM area which is used as a work area of the CPU 6, a character position data area 11 to store display positions of character patterns, and the like.

Figure 2:
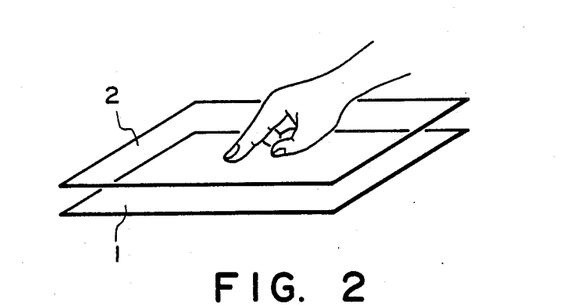
FIG. 2 is a diagram showing a use state of a touch panel.

FIG. 2 is a diagram showing a touch input state from the touch panel 2.

An operator touches the position of the corresponding item or the like on the touch panel 2 by using a finger or the like while looking at the screen of the CRT display. Thus, the item can be designated and the coordinates can be input.

Setting and Operation of the Cleaning Mode (FIGS. 3 to 6)

Figure 3:
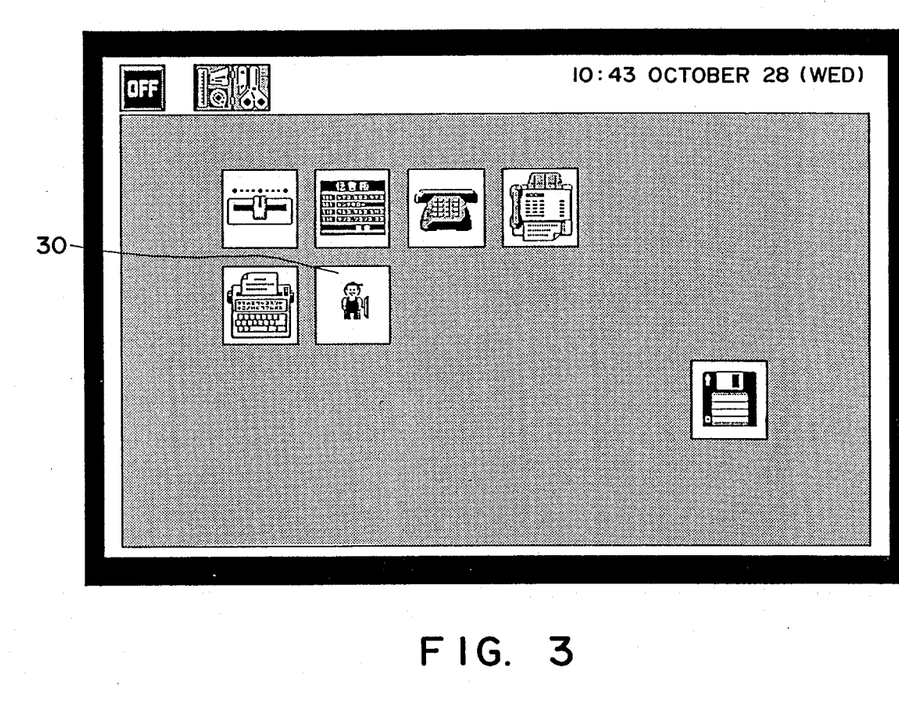
FIG. 3 is a diagram showing a screen of a main menu of the apparatus of the embodiment.

FIG. 3 shows a main menu which is displayed on the CRT display 1 by turning on the power source of the information input apparatus.

Each function of the apparatus is displayed by an icon and is started by touching the icon by the operator through the touch panel 2. Reference numeral 30 denotes an icon to designate the cleaning mode. By touching the icon 30, the cleaning mode is set.

Figure 4:
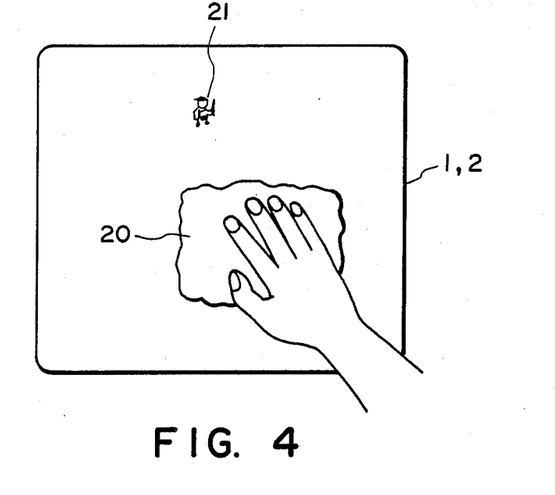
FIG. 4 is a diagram showing a cleaning state of the touch panel surface in the first embodiment.

FIG. 4 is a diagram showing a cleaning state by the operator in the cleaning mode.

In the diagram, reference numeral 21 denotes a character pattern indicative of the cleaning mode. This pattern data is stored in the character pattern area 9 in the memory 7 and is displayed by being moved horizontally on the screen of the CRT display 1. A cloth 20 is used to clean by the operator. Since the portion of the touch panel 2 which can be input is only the portion in which the character pattern 21 is displayed, there is no fear such that the other portions are input even when they are touched to clean.

If a character pattern is displayed in the cleaning area and becomes an obstacle, by touching the pattern 21 and then touching another position on the screen, the pattern 21 is moved to this position. In this manner, by moving the character pattern to an arbitrary outside position of the cleaning portion, the screen of the CRT display 1 can be cleaned. The cleaning mode is cancelled by once touching the character pattern 21 and stopping the movement of the character pattern 21 and again touching the character pattern 21.

Figure 5:
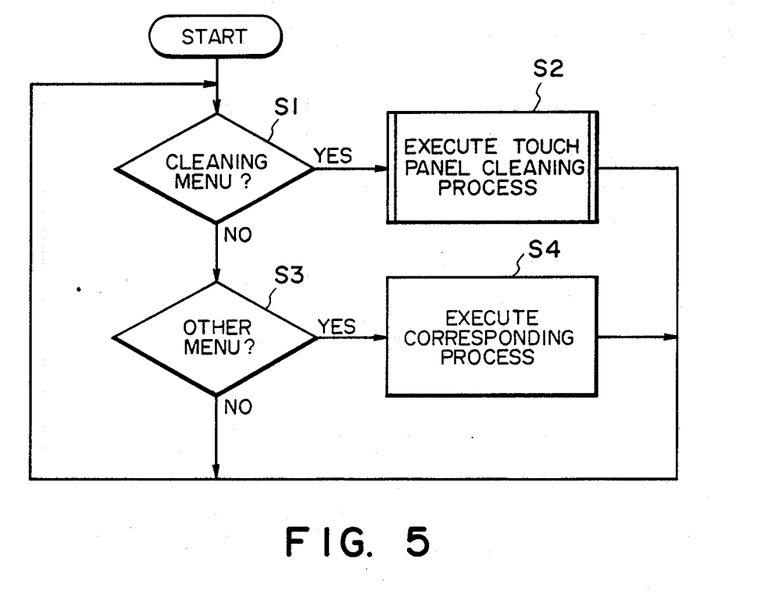
FIG. 5 is a flowchart for processes to access a cleaning mode.

FIG. 5 is a flowchart showing the operation to start the cleaning mode in the apparatus in the first embodiment. The control program shown in this flowchart is stored in the program ROM 8.

Figure 6:
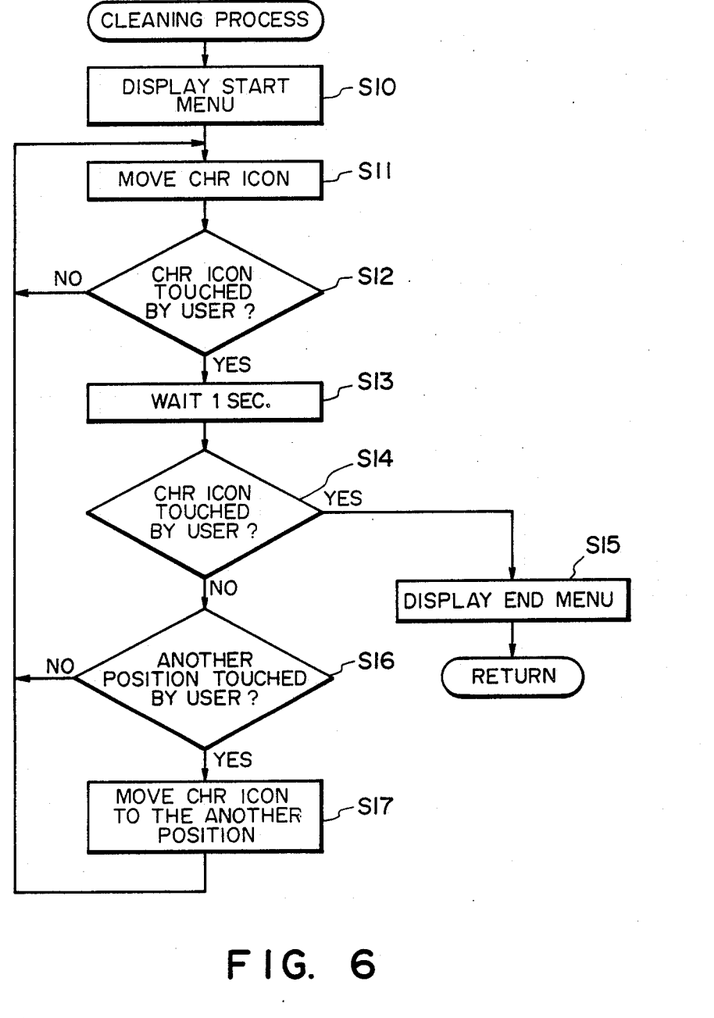
FIG. 6 is a schematic flowchart for the cleaning mode function in the first embodiment.

In step S1, a main menu as shown in FIG. 3 is displayed. When the icon 30 to designate the cleaning mode is touched, step S2 follows and the cleaning mode of the touch panel 2 shown in a flowchart of FIG. 6 is started. When another icon is touched in step S3, the function program corresponding to the touched icon is executed in step S4.

FIG. 6 is a schematic flowchart for the touch panel cleaning function shown in step S2 in FIG. 5.

In step S10, all of the function menu and the like displayed are erased. The character pattern (backward pattern) shown by the icon 21 in FIG. 4 is set to the starting screen and displayed on the screen of the CRT display 1. In step S11, the character icon is slightly moved in one direction (to the right or left). At this time, character position data 11 in the memory 7 is also similarly updated. When this icon is moved, for instance, to the right and reaches the right end of the screen, the icon is then displayed so as to move to the left.

In step S12, a check is made to see if the character icon 21 has been touched or not by comparing the values of the input coordinates from the X-Y detection circuit 5 with the character position data 11. That is, a check is made to see if they coincide or not. If they coincide (when the icon 21 has been touched), step S13 follows and the character icon 21 is turned around and the apparatus waits for one second. In step S14, a check is made to see if the character icon 21 has been touched again or not. If it has been touched, step S15 follows and the end screen of the cleaning mode is displayed (in this embodiment, the character icon 21 faces forward and bows) and the cleaning mode is cancelled.

If the character icon 21 is not touched in step S14, step S16 follows and a check is made to see if another position on the screen has been touched or not. If another position on the screen has been touched, step S17 follows and the character icon 21 is moved to this position and displayed.

It is also possible to generate background music in the cleaning mode.

(B) SECOND EMBODIMENT

Since a constitution of an information input apparatus in the second embodiment is the same as that of the first embodiment shown in FIG. 1, its description is omitted.

Figure 7:
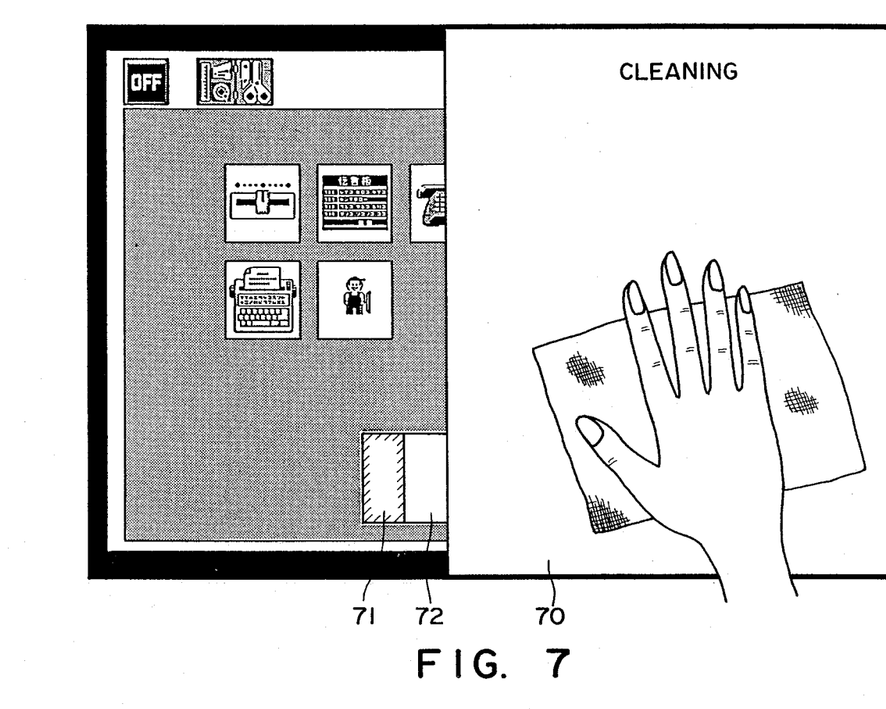
FIGS. 7 and 8 are diagrams showing a cleaning state in the second embodiment.
Figure 8:
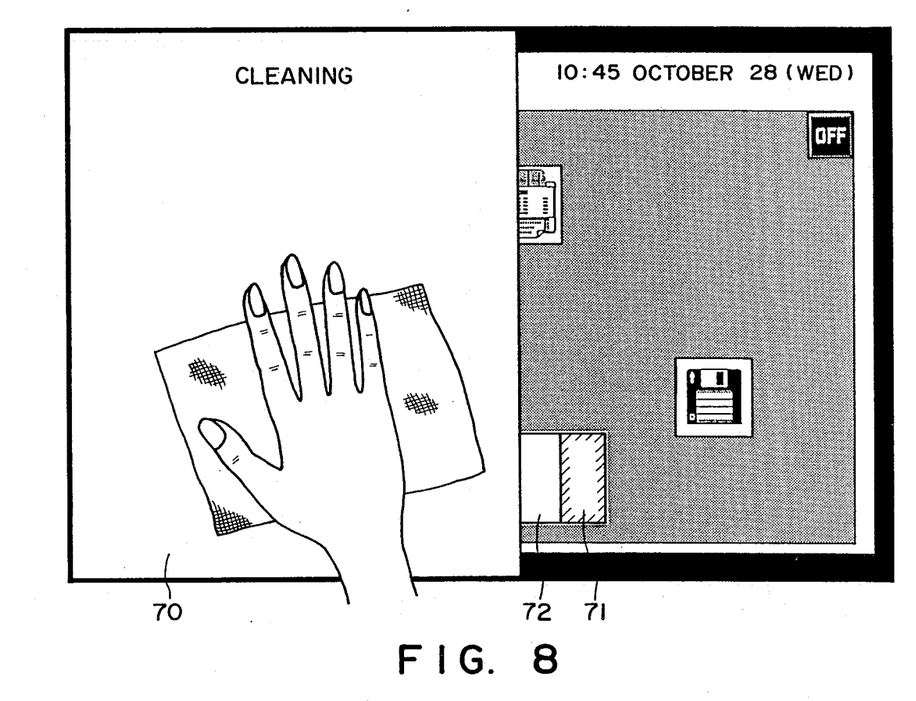

FIGS. 7 and 8 are diagrams for explaining the operation of the second embodiment.

FIG. 7 shows the case where almost the right half of the main menu screen is designated as a cleaning surface 70. All of the inputs on the cleaning surface 70 are inhibited. The menu is displayed in the left half of the screen and it is possible to input. Reference numeral 71 denotes a switching indicating section of the cleaning surface. By touching this portion, the cleaning surface 70 can be switched so as to move to the left side of the screen as shown in FIG. 8. Reference numeral 72 denotes an end indicating section of the cleaning function. By touching this portion, the end of the cleaning function can be designated.

FIG. 8 shows the case where the cleaning surface 70 is set to the right side of the screen by switching the cleaning surface. As will be obvious form the comparison with FIG. 7, the switching indicating section 71 of the screen and the end indicating section 72 of the cleaning function are displayed by changing the positions in association with the movement of the cleaning surface 70.

Figure 9:
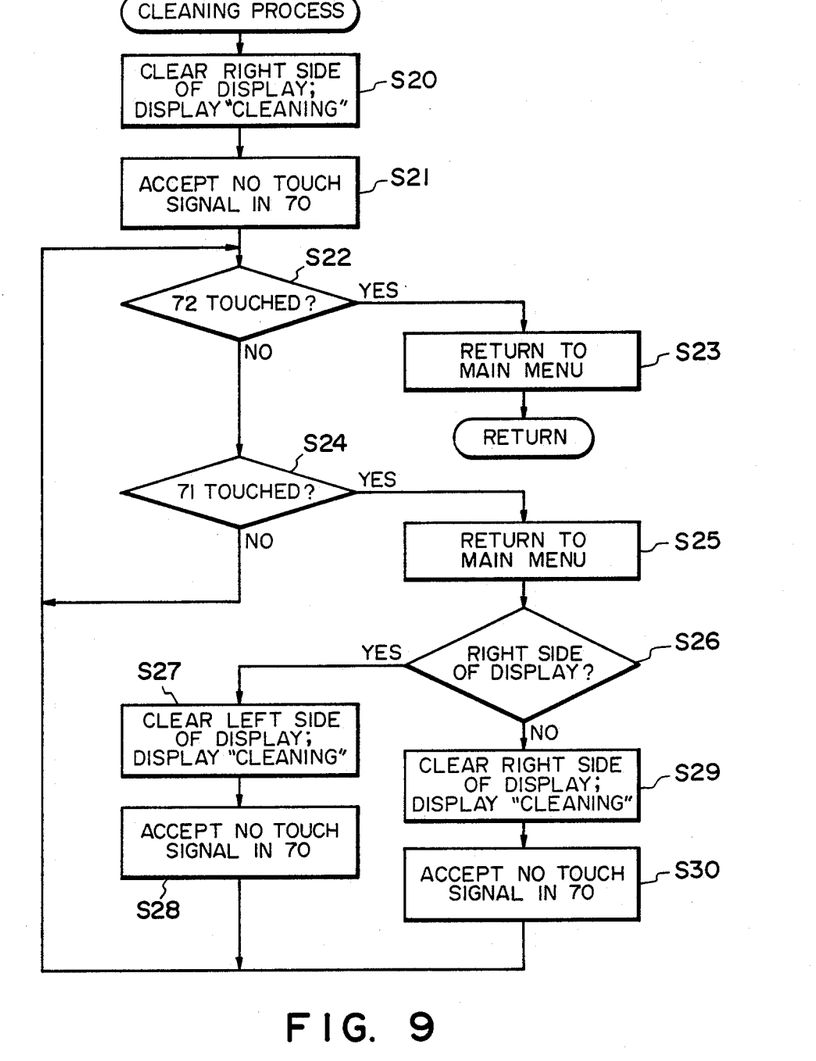
FIG. 9 is a schematic flowchart for the cleaning processes in the second embodiment.

FIG. 9 is a flowchart for the process of the cleaning operation in the second embodiment.

In the main menu displayed, by touching the icon 30, this mode is started. Then, in step S20, almost 60% of the right side of the screen is cleared and "cleaning" is displayed in the upper portion thereof. In step S21, no touch signal is accepted in the cleaning surface 70. In step S22, a check is made to see if the end indicating section 72 of the cleaning mode has been touched or not. If YES, step S23 follows and the display screen is returned to the original main menu, thereby enabling an input from the touch panel 2 to be accepted.

In step S24, if the switching indicating section 71 of the cleaning surface has been touched, the display screen is once returned to the original state (the main menu is displayed) in step S25. In step S26, a check is made to see if the right side of the screen is the cleaning surface or not in the just preceding state. In this case, step S27 follows and almost 60% of the left side of the screen is cleared and set to the cleaning surface 70 as shown in FIG. 8. In step S28, the acception of the input in the left side of the touch panel 2 corresponding to the cleaning surface 70 is inhibited.

In step S26, if the right side of the screen in the just preceding state is not the cleaning surface, step S29 follows and almost 60% of the right side of the screen is cleared and set to the cleaning surface 70 as shown in FIG. 7. In step S30, the input of the portion corresponding to the cleaning surface 70 is inhibited.

Although the embodiment has been described with regard to the case where the screen is divided into two right and left portions, the invention is not limited to this example. For instance, the screen can be divided into upper and lower portions. Further, it is obvious that the screen can be also divided into three or more portions.

On the other hand, for example, when the icon indicative of the area where the input can be performed is displayed on the corner of the screen and the portions where this icon is not displayed are first cleaned and then the portion around the icon is cleaned, the icon can be moved to another corner by touching it. At this time, it is also possible to cancel the cleaning mode by continuously touching the icon.

In the first and second embodiments, the cleaning mode has been set or cancelled by touching the icon displayed on the screen of the CRT display by the touch panel. However, a mode change-over switch to set the cleaning mode can be also separately provided on the touch panel. In this case, the mode change-over switch is used to set or cancel the cleaning mode as an operating mode of the information input apparatus to inhibit the input of information to the CPU 6 irrespective of the touch to the input surface of the touch panel 2 in the state in which the power source of the information input apparatus is turned on. Practically speaking, the mode change-over switch is provided as a switch to connect or disconnect the output of the X-Y detection circuit 5 and the input of the CPU 6. The state in which the X-Y detection circuit 5 and CPU 6 are disconnected by the change-over switch corresponds to the cleaning mode. The state in which they are connected corresponds to the state in which the cleaning mode is cancelled.

As described above, according to the embodiments, there are advantages such that the touch panel surface can be cleaned without turning off the power source of the apparatus and an erroneous input by the touch of the touch panel during the cleaning is eliminated.

On the other hand, since the cleaning mode can be set or cancelled on the screen even in the cleaning mode, the operation is simplified.

What is claimed is:

1. An information processing system in which information is input by touching a surface of an input panel provided on a screen of a display device, comprising:
    mode setting means for setting a cleaning mode of the input panel on the screen of the display device;
    input control means for setting an input inhibition area of information on the input panel when the cleaning mode is set by said mode setting means; and
    inhibition area display means for displaying information specifying a display area on the screen of the display device when the cleaning mode is set by said mode setting means, the display area corresponding to the inhibition area on the input panel.

2. A system according to claim 1, further comprising inhibition area changing means for changing the input inhibition area set by said input control means on the input panel.

3. A system according to claim 1, wherein said mode setting means activates through said input panel a position of a character displayed on the screen of the display device, thereby setting the cleaning mode.

4. A system according to claim 3, further comprising means for changing the position of the character displayed on the screen of the display device.

5. An information processing system in which information is input by touching a surface of an input panel provided on a screen of said display device, comprising:
    mode setting means for setting a cleaning mode of the input panel on the screen of the display device;
    input control means for dividing the surface of the input panel into first and second areas when the cleaning mode is set by said mode setting means and for setting the first area to inhibit an input of the information and for setting the second area to allow an input of the information;
    area display means for displaying that the first area and the second area are set on the input panel by said input setting means; and
    area switching means for switching the first area and the second area which are set by said area display means.

6. A system according to claim 5, wherein said mode setting means sets the cleaning mode by activating through the input panel a position of a character displayed on the screen of the display device.

* * * * *

UNITED STATES PATENT AND TRADEMARK OFFICE
CERTIFICATE OF CORRECTION

PATENT NO. : 4,952,932

DATED : August 28, 1990

INVENTOR(S) : Sugino, et al.

It is certified that error appears in the above-identified patent and that said Letters Patent is hereby corrected as shown below:

COLUMN 6:

Line 28, "said display device" should read
--a display device--.

Signed and Sealed this

Seventh Day of April, 1992

Attest:

HARRY F. MANBECK, JR.

Attesting Officer

Commissioner of Patents and Trademarks